United States Patent
Faraldo, II

(10) Patent No.: US 8,219,663 B2
(45) Date of Patent: Jul. 10, 2012

(54) METHOD OF AND APPARATUS FOR NOTIFICATION OF STATE CHANGES IN A MONITORED SYSTEM

(75) Inventor: David D. Faraldo, II, Foster City, CA (US)

(73) Assignee: Red Hat, Inc., Raleigh, NC (US)

( * ) Notice: Subject to any disclaimer, the term of this patent is extended or adjusted under 35 U.S.C. 154(b) by 1660 days.

(21) Appl. No.: 10/016,117

(22) Filed: Oct. 30, 2001

(65) Prior Publication Data

US 2002/0107958 A1    Aug. 8, 2002

Related U.S. Application Data

(63) Continuation-in-part of application No. 09/703,329, filed on Oct. 31, 2000, now Pat. No. 8,145,742.

(51) Int. Cl.
*G06F 15/173* (2006.01)

(52) U.S. Cl. .......... 709/224; 709/221; 709/223

(58) Field of Classification Search .......... 709/224, 709/221, 223
See application file for complete search history.

(56) References Cited

U.S. PATENT DOCUMENTS

| | | | | |
|---|---|---|---|---|
| 5,619,656 A | * | 4/1997 | Graf | 709/224 |
| 5,748,884 A | * | 5/1998 | Royce et al. | 714/57 |
| 5,754,111 A | | 5/1998 | Garcia | |
| 5,870,559 A | | 2/1999 | Leshem et al. | 395/200.54 |
| 5,949,976 A | | 9/1999 | Chappelle | |
| 5,958,008 A | | 9/1999 | Pogrebisky et al. | 709/223 |
| 5,987,514 A | * | 11/1999 | Rangarajan | 709/224 |
| 6,003,143 A | | 12/1999 | Kim et al. | 714/38 |
| 6,006,260 A | | 12/1999 | Barrick, Jr. et al. | 709/224 |
| 6,012,087 A | | 1/2000 | Freivald et al. | 709/218 |
| 6,064,653 A | | 5/2000 | Farris | 370/237 |
| 6,101,540 A | * | 8/2000 | Graf | 709/224 |
| 6,138,157 A | | 10/2000 | Welter et al. | 709/224 |
| 6,157,618 A | | 12/2000 | Boss et al. | |
| 6,175,869 B1 | | 1/2001 | Ahuja et al. | |
| 6,445,774 B1 | | 9/2002 | Kidder et al. | |
| 6,463,462 B1 | * | 10/2002 | Smith et al. | 709/206 |
| 6,480,745 B2 | | 11/2002 | Nelson et al. | |
| 6,507,852 B1 | * | 1/2003 | Dempsey et al. | 1/1 |
| 6,519,714 B1 | | 2/2003 | Sweet et al. | |
| 6,529,784 B1 | | 3/2003 | Cantos et al. | |

(Continued)

FOREIGN PATENT DOCUMENTS

WO    0 022 534    4/2000

(Continued)

OTHER PUBLICATIONS

Fielding, Roy T., "Maintaining Distributed Hypertext Infostructures: Welcome to MOMspider's Web.," Paper presented at WWW94, Geneva, Switzerland, May 25-27, 1994, printed from website: www.ics.uci.edu/pub/websoft/MOMspider/WWW94/paper.html; 24 pgs.

(Continued)

*Primary Examiner* — Wing Chan
*Assistant Examiner* — Nicholas Taylor
(74) *Attorney, Agent, or Firm* — Lowenstein Sandler PC

(57) ABSTRACT

A method and apparatus is described for enabling an advanced notification rule. According to one embodiment, the advanced notification rule may be generated to suspend, redirect or automatically acknowlegde standard notifications, or transmit supplement notifications.

20 Claims, 10 Drawing Sheets

U.S. PATENT DOCUMENTS

| | | | |
|---|---|---|---|
| 6,564,342 B2 | 5/2003 | Landan | |
| 6,567,937 B1 | 5/2003 | Flores et al. | |
| 6,591,094 B1 | 7/2003 | Bentley | |
| 6,629,106 B1 * | 9/2003 | Narayanaswamy et al. | 707/104.1 |
| 6,694,364 B1 * | 2/2004 | Du et al. | 709/224 |
| 6,718,535 B1 | 4/2004 | Underwood | |
| 6,757,850 B1 | 6/2004 | Lehner | |
| 6,766,368 B1 * | 7/2004 | Jakobson et al. | 709/224 |
| 6,813,634 B1 * | 11/2004 | Ahmed | 709/224 |
| 6,832,341 B1 * | 12/2004 | Vijayan | 714/43 |
| 2001/0034769 A1 | 10/2001 | Rast | |
| 2001/0044840 A1 | 11/2001 | Carleton | |
| 2001/0052087 A1 * | 12/2001 | Garg et al. | 714/37 |
| 2001/0054064 A1 | 12/2001 | Kannan | |
| 2001/0056483 A1 | 12/2001 | Davis et al. | |
| 2002/0049833 A1 | 4/2002 | Kikinis | |
| 2002/0052947 A1 | 5/2002 | Duimovich et al. | |
| 2002/0057678 A1 | 5/2002 | Jiang et al. | |
| 2002/0116491 A1 | 8/2002 | Boyd et al. | |

FOREIGN PATENT DOCUMENTS

| | | |
|---|---|---|
| WO | WO 00/19320 | 4/2000 |

OTHER PUBLICATIONS

Fox J. et al. "Web-Based Automated Reporting: Saving Time, Money and Tree" 2$^{nd}$ International Symposium on Spacecraft Ground Control and Data Systems, Feb. 1999, XP002227342 Foz de Iguacu, Brasil.

Gralla, Preston, "How the Internet Works," Ziff-Davis Press, Special Edition, 1997, pp. 12 and 13 (2 pp.).

TelAlert UMS 5.2 Quick Start Guide, 2000, Telamon, Inc., TA-TD-002-3, 32 pages.

Heinz-Gerd Hegering, Sebastian Abeck, Bernard Neumair, "Integrated Management of Networked Systems, Concepts, Architectures, and Their Operational Application", ISBN 3-932588-16-9, 1998, cover sheet and pp. 322-327.

Heinz-Gerd Hegering, Sebastian Abeck, "Integriertes Netz- und Systemmanagement", ISBN 5-89319-508-4, 1995, cover sheet and pp. 299-329.

NetSaint web Homepage at www.netsaint.org, Sep. 24, 2000, 3 pages.

*TelAlert* Datasheet, Telamon, Inc., Oakland, CA., Jun. 16, 1999, 2 pages.

G. Trent and M. Sake, "WebStone: The First generation in HTTP Server Benchmarking," printed from website at: http//www.mindcraft.com/webstone/paper.html. Feb. 1995, 11 pgs.

Almeida, Jussara, et al., "Measuring th eBehavior of a World-Wide-Web Server," in: Seventh Conference on High Performance Networking (HPN), Apr. 1997. pp. 57-72.

Senna, Jeff, "PageSentry keeps tabs on Internet servers," InfoWorld, Jun. 30, 1997, vol. 19, Issue 26, p. 82B.

Davis, Beth, "Web Services Help Measure Site Success," Communications Week, Sep. 30, 1996, Issue 631, 2 pages.

NFR® Intrusion Detection Appliance User's Guide, Version 5.0, Network Flight Recorder, Inc., Oct. 2000.

Ranum, Marcus J., et al., "Implementing a Generalized Tool for Network Monitoring," 1997 LISA XI Conference, Oct. 26-31, 1997—San Diego, CA, pp. 1-8.

LaLiberte, & Braverman, "A Protocol for Scalable Group and Public Annotations," from website www.igd.fhg.de/archive/1995_www95/proceedings/papers/100/scalable-annotations.html. 10 pgs.

Marc Abrams & Stephen Williams, "Complementing Surveying and Demographics with Automated Network Monitoring," Jun. 17, 1996, http://vtopus.cs.vt.edu/~chitra/docs/9623j/96w3j.html, 22 pgs.

Monk, Tracie, et al., "Internet Data Acquisition & Analysis: Status & Next Steps," from website: www.caida.org/outreach/papers/data-inet97.html, Mar. 21, 1997, 16 pgs.

Sedayao, Jeffrey, C. IPPM Mail Archives: draft of end to end metrics (ICMP, HTTP) document, from website: www.advanced.org/IPPM/archive.1/0226.html, Nov. 26, 1996, 14 pgs.

Cottrell, L. & Logg, C., "Network Monitoring for the LAN & WAN," Talk given at ORNL, Jun. 25, 1996, from website: www.slac.stanford.edu/grp/scs/net/talk/ornl.htm, 16 pgs.

Installation and Configuration Manual for Big Brother Systems and Network Monitors, Ver. 1.6b, Jan. 3, 2001 and READ.ME. CHANGES.file to versions since Beta 0.91, Nov. 18, 1996 printed from website:www.bb4.com; 34 pgs and 12 pgs respectively.

Fielding, Roy T., "Maintaining Distributed Hypertext Infostructures: Welcome to MOMspider's Web.," Paper presented at WWW94, Geneva, Switzerland, May 25-27, 1994, printed from website: www.ics.uci.edu/pub/websoft/MOMspiderWWW94/paper.html; 24 pgs.

Almeida, JM; Almeida, V; and Yates, D. "WebMonitor: a Tool for Measuring World-Wibe Web Server Performance," Apr. 1997, printed from website: www.firstmonday.dk/issues/issues2_7/almeida/; 24 pgs.

Soni, Tarun, "An Integrated Satellite Based Asset Management System" 1996, 8 pages, Torrey Science Corporation.

Communication pursuant to Article 96(2) EPC, European Patent Office, Applicant Nocpulse, Inc., Application No. 01-992 973.6-2201, Aug. 13, 2004, 6 pages.

Communication pursuant to Article 96(2) EPC for European Patent Application No. 01992973.6-2201 (which claims priority to U.S. Appl. No. 09/703,329), dated Mar. 7, 2005.

International Search Report, International application No. PCT/US01/46021, International filed Oct. 18, 2001.

Red Hat Office Action for U.S. Appl. No. 09/703,329 mailed Aug. 12, 2010.

Red Hat Office Action for U.S. Appl. No. 09/703,329 mailed Mar. 30, 2010.

BPAI Decision for U.S. Appl. No. 09/703,329 mailed Sep. 9, 2009.

Red Hat Office Action for U.S. Appl. No. 09/703,329 mailed Dec. 29, 2006.

Red Hat Advisory Office Action for U.S. Appl. No. 09/703,329 mailed Aug. 4, 2006.

Red Hat Office Action for U.S. Appl. No. 09/703,329 mailed Jun. 8, 2006.

Red Hat Office Action for U.S. Appl. No. 09/703,329 mailed Apr. 21, 2006.

Red Hat Office Action for U.S. Appl. No. 09/703,329 mailed Sep. 21, 2005.

Red Hat Office Action for U.S. Appl. No. 09/703,329 mailed May 19, 2005.

Red Hat Advisory Office Action for U.S. Appl. No. 09/703,329 mailed Feb. 8, 2005.

Red Hat Office Action for U.S. Appl. No. 09/703,329 mailed Nov. 5, 2004.

Red Hat Office Action for U.S. Appl. No. 09/703,329 mailed Apr. 1, 2004.

* cited by examiner

| TEST | PORT # | MONITORING |
|---|---|---|
| check_dig | NP | Tests host DNS |
| check_disk | NP | Checks disk space (%) host system and generates alert if percentage is above threshold values. |
| check_dns_resolution | NP | Obtains IP address for specified host/domain query using nslookup. Can specify optional DNS server or default to specified server. |
| check_ftp | 21 | Tests an FTP connection with the host and generates an alert if answer time is above threshold values. |
| check_printer | NP | Tests the status of a printer. |
| check_http/htttps | 80 (http) 443 (https) | Test the HTTP service on the host. Test normal and secure severs and generates an alert if the answer time is above a threshold value. Follows redirects, searches for strings and regular expressions, checks connection times, and reports on certificate expiration times. |
| check_imap | 143 | Tests the IMAP4 service on the specified host and generates an alert if answer time is above threshold values. |
| check_ircd | 6667 | Tests IRC daemon on the host and returns an alert of the number of users is above threshold values. |
| check_nntp | 119 | Tests the network news service on host and generates an alert if answer time is above threshold values. |
| check_ntp | NP | Tests Network Time service and generates an alert when offset(s) is above threshold values. |
| check_oracle | NP | Tests remote or local TNS status and local database status. |
| check_pop | 110 | Tests POP mail service on host and generates an alert if answer time is above threshold values. |
| check_postgresql | 5432 | Tests postgres SQL service on host and generates an alert if answer time is above threshold values. |
| check_real | 554 | Tests the IMAP4 service on the specified host (at port 554) and generates an alert if answer time is above threshold values. |
| check_rpc | | Tests if a RPC service is registered and running on host using rpcinfo command. |
| check_smtp | 25 | Tests the SMTP mail service on host and generates an alert if answer time is above threshold values. |
| check_snmp | | Tests SNMP service on host and generates an alert if answer time is above threshold values. |
| check_ssh | 22 | Tests SSH service on host and generates an alert if request times out. |
| check_tcp | Any | Tests TCP connections with host and generates an alert if answer time is above threshold values. |
| check_time | NP | Tests time port on host and generates an alert if answer time is above threshold values. |
| check_udp | Any | Tests UDP connection on host and generates an alert if answer time is above threshold values. |

Figure 2B

| PARAMETER | THRESHOLD LEVELS | THRESHOLD VALUES |
|---|---|---|
| Disk Utilization | OK<br>Warning<br>Critical | <75%<br>75%<br>90% |
| Processor Utilization | OK<br>Warning<br>Critical | <70%<br>70%<br>85% |
| Load | OK<br>Warning<br>Critical | <0.8<br>0.8<br>1 |
| Memory Utilization | OK<br>Warning<br>Critical | <20%<br>20% free<br>10% free |
| Swap Space | OK<br>Warning<br>Critical | <20%<br>20% free<br>10% free |
| Number of Users | OK<br>Warning<br>Critical | <10 users<br>10 users<br>20 users |
| Number of Processes | OK<br>Warning<br>Critical | <400 processes<br>400 processes<br>700 processes |

Figure 2C

METHOD OF AND APPARATUS FOR NOTIFICATION OF STATE CHANGES IN A MONITORED SYSTEM

CROSS-REFERENCE TO RELATED APPLICATIONS

This is a continuation-in-part of application Ser. No. 09/703,329, filed on Oct. 31, 2000, now U.S. Pat. No. 8,145,742 that is still pending.

FIELD OF THE INVENTION

This invention relates to the field of network administration and, in particular, to notification of state changes in a monitored system on a network.

BACKGROUND

The infrastructure of the Internet may be described in a simplified manner as a collection of computer systems (e.g., hardware and software) that are interconnected by public/private networks (e.g., transmission lines and routers) to enable the transfer of information among them, as illustrated in FIG. 1. The Internet infrastructure is an intricate, extremely rapidly growing mixture of complex and disparate hardware systems, networks, and applications. Maintaining knowledge of these components requires expertise (e.g., system administrators and information technology professionals) that is not easily acquired and often difficult to keep. In addition, much of a company's Internet infrastructure may often be running outside of the company's enterprise in that it is hosted at a third party data center or co-location facility.

The disadvantage of hosting a company's infrastructure at a data center is the overhead of trying to monitor, manage, and support that hosted infrastructure. Data centers may not provide any information on systems and services running from the switchport down. The result is that companies that host may have no critical view into what is actually happening on the infrastructure for which they have invested large amounts of money.

There are several point solutions attempting to remedy this problem. A point solution is a solution that attempts to address a problem from a particular, and often limited, vantage point. Some examples of point solutions include server monitoring software, network monitoring software, or an application monitoring service. None of these point solutions may be sufficient to reliably monitor a site. This may leave companies scrambling to pick and fit together a mixture of disparate, often overlapping, solutions, none of which span and scale to remedy the entire infrastructure hosting problem.

Many of these solutions also grow out of software companies that have little experience in the infrastructure hosting or Internet content creation industry. This may leave their products limited in scope and often burdens the hosting company with installing and managing additional software in their hosted environment. It also may create scaling problems for installing agents for every monitored aspect on every machine in a hosted environment.

Another solution to the infrastructure hosting problem is from a "lights out" point of view in that the solution attempts to "knock the lights out of" the problem in a quick, all encompassing fashion. Companies employing such a solution typically own the equipment, build the applications, monitor and manage the infrastructure, support the hardware and software, and run the hosted environment. These companies attempt to cover every aspect of the hosting environment and infrastructure support and management problem. Such attempts may significantly add to their cost of doing business. For example, monitoring of the infrastructure for a do-it-yourself company requires the installation of software agents on the host systems. As such, a company's resources may be consumed for storage, maintenance, and version progressions of such software. Additionally, applications used by these companies tend to be very code intensive and the operating system of the host systems may not be very reliable. Such platforms may not be very scalable or robust and, thus, may not be as desireable.

The overriding problem with these prior solutions is that they focus on attacking infrastructure problems, rather than proactively preventing them. Such reactive solutions are limited in their effectiveness in that they may not prevent the same problems from recurring and they may not prevent the occurrence of new problems.

SUMMARY OF THE INVENTION

The present invention pertains to a method and apparatus for enabling an advanced notification rule. According to one embodiment, the advanced notification rule may be generated to suspend, redirect or automatically acknowledge standard notifications, or transmit supplement notifications.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which:

FIG. 2B illustrates an exemplary table of monitored services and states for embodiments of host parameters.

FIG. 2C is an exemplary table illustrating threshold levels and corresponding values that may be set for embodiments of host parameters.

DETAILED DESCRIPTION

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions.

In one embodiment, a network site monitoring system may be used to provide a means to proactively monitor a business site's services and resources. Various parameters of a host may be configured for monitoring for the occurrence of a predetermined event such as a state change or exceeding a threshold. Upon such occurrence, a notification may be sent to one or more appropriate persons designated by the business site. The notification system may notify the appropriate person for a number of times over a configurable amount of time using various communication means. If that person fails to respond, the system may escalate the notification to another person based on a set of escalation rules. The escalation rules determine who should be notified next in the event that a preceding recipient of a notification fails to respond to a notification with an acknowledgement.

In another embodiment, information about host parameters, such as statistical reports and historical trends, may be generated and provided to the business site. In another embodiment, host asset information may be generated to provide a business site with an account of all hardware and software assets in their infrastructure. In yet another embodiment, a portal may be provided to enable a business site to configure the monitoring, escalation, and reporting process and provide access to the generated data.

Figure 1:
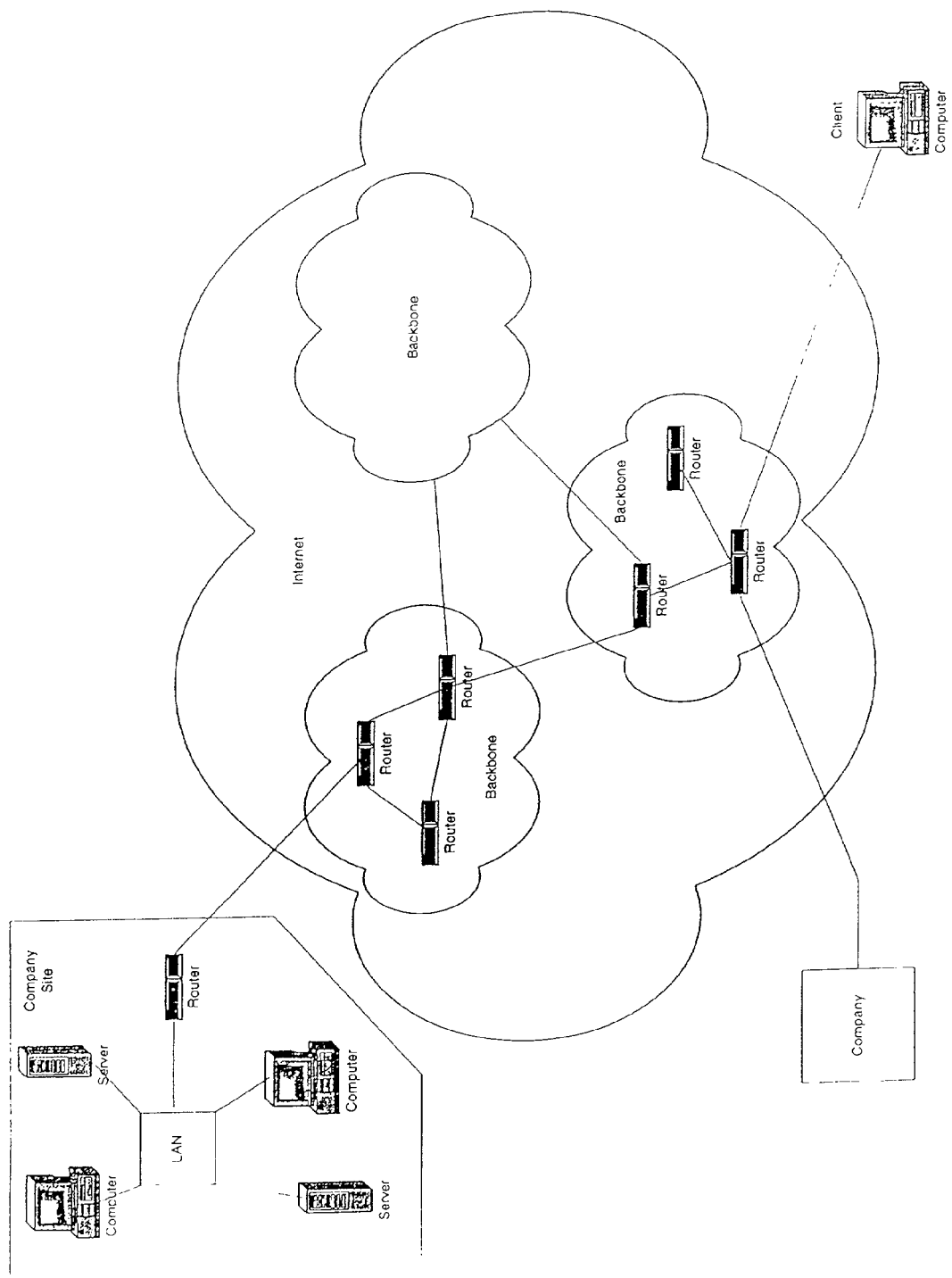
FIG. 1 illustrates an internetwork architecture.
Figure 2A:
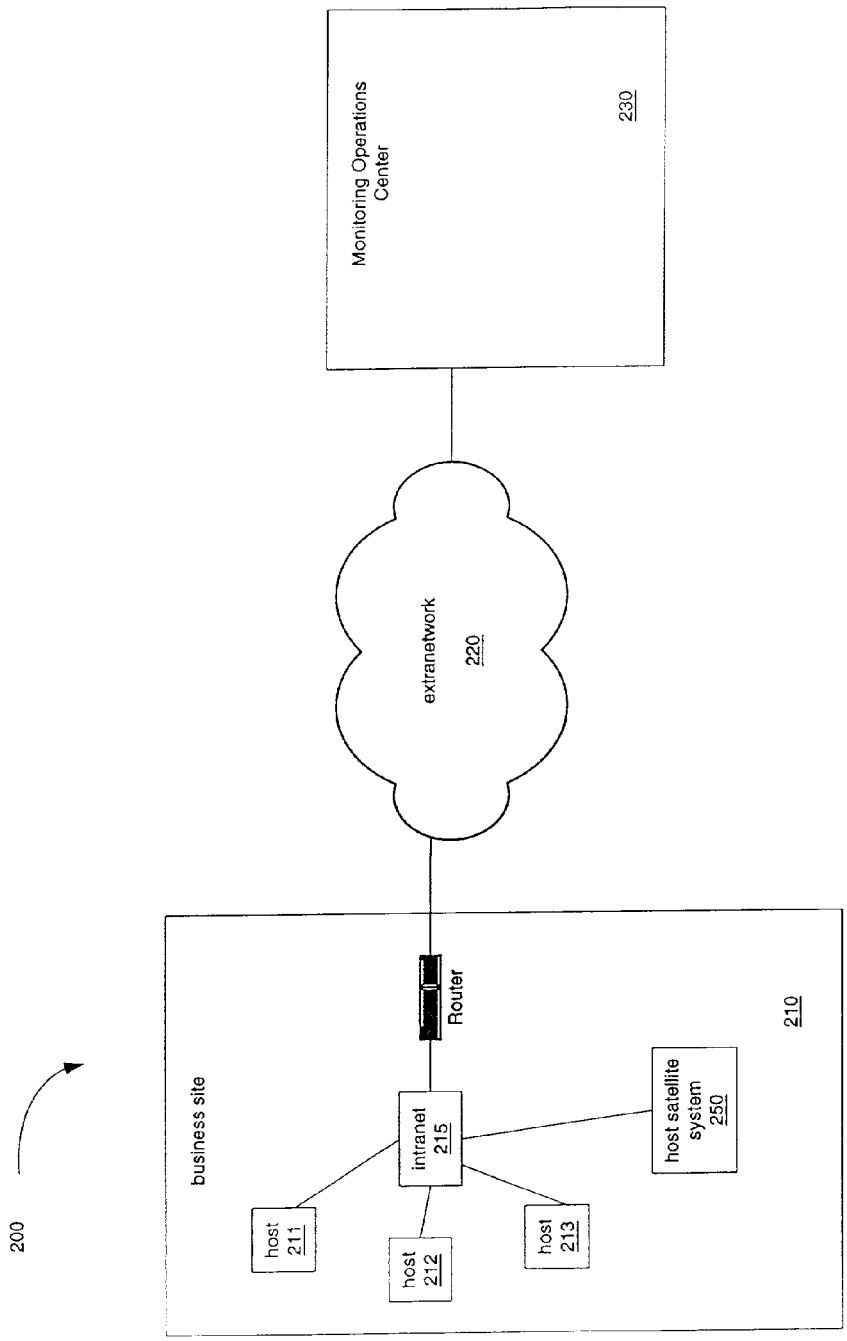
FIG. 2A illustrates one embodiment of a network site monitoring system.

FIG. 2A illustrates one embodiment of a network site monitoring system. The network monitoring system 200 may include various hardware and software components to perform monitoring functions. The network monitoring system 200 includes a business site 210 and a monitoring operations center (MOC) 230. In one embodiment, MOC 230 may be located remotely from business site 210. Alternatively, MOC 230 may be located locally to business site 210. Business site 210 and MOC 230 may be coupled together via extranetwork 220, such as an Internet Protocol (IP) network.

An IP network transmits data in the form of packets that include an address specifying the destination systems for which communication is intended. Business site 210 and MOC 230 may communicate with each other using various protocols, for examples, HTTP, Telnet, NNTP, and FTP. Security layers for managing the security of data transmission may also reside between the application protocols and the lower protocol (TCP/IP) layers, for examples: Secure Sockets Layers (SSL). Alternatively, secure application protocols may be used, for examples, Secure HTTP (HTTPS) and Secure Shell (SSH). These various protocols are known in the art; accordingly, a detailed discussion is not provided herein.

Business site 210 may include one or more computer systems, or hosts, (e.g., hosts 211-213) connected together via intranetwork 215. Three hosts 211-213 are shown only for illustrative purposes. Business site 210 may have more or less than three hosts. Hosts 211-213 may be configured to perform as servers. In one embodiment, intranetwork 215 is a local area network (LAN). The local area network may be either a wired or wireless network. Alternatively, hosts 211-213 may be coupled together using other types of networks, for example, a metropolitan areas network (MAN) or a wide area network (WAN) with various topologies and transmission mediums.

Business site 210 includes a host satellite system 250 coupled to intranetwork 215. The host satellite system 250 may reside locally at business site 210 to monitor hosts 211-213. Host satellite system 250 may be connected to intranetwork 215 inside of its firewall (not shown). Alternatively, host satellite system 250 may be connected outside of the firewall if the firewall is configured to allow host satellite system 250 access to hosts 211-213. Host satellite system 250 includes monitoring software that monitors performance characteristics and services of hosts 211-213 (e.g., state changes, connection status, etc.), as discussed below. Host satellite system 250 is a digital processing system that may perform various client-server functions.

A host (e.g., host 211) may be configured to provide various services for clients that are accessed through ports of the host connected to intranetwork 215. Types of network services include, for examples, electronic mail using a Simple Mail Transfer Protocol (SMTP), web page display using HTTP, news article distribution using a Network News Transfer Protocol (NNTP), fetching email from a remote mailbox using a Post Office Protocol-3 (POP3), and text file retrieval for viewer displaying using Gopher, etc. Each service may be configured on an industry standard port or on a custom port. If a service operates with a custom port, then host satellite system 250 may either be preprogrammed with the port information or perform probes to determine a port's configuration.

For example, if host 211 is configured to operate as an HTTP server, host satellite system 250 may attempt to establish a connection (e.g., ping) to industry standard TCP port 80 (or port 443 if HTTPS is used) to determine if it is connected to intranetwork 215. If no reply is received, then port 80 for that particular host 211 is either down or host 211 may be using a different port for the service.

Figure 3:
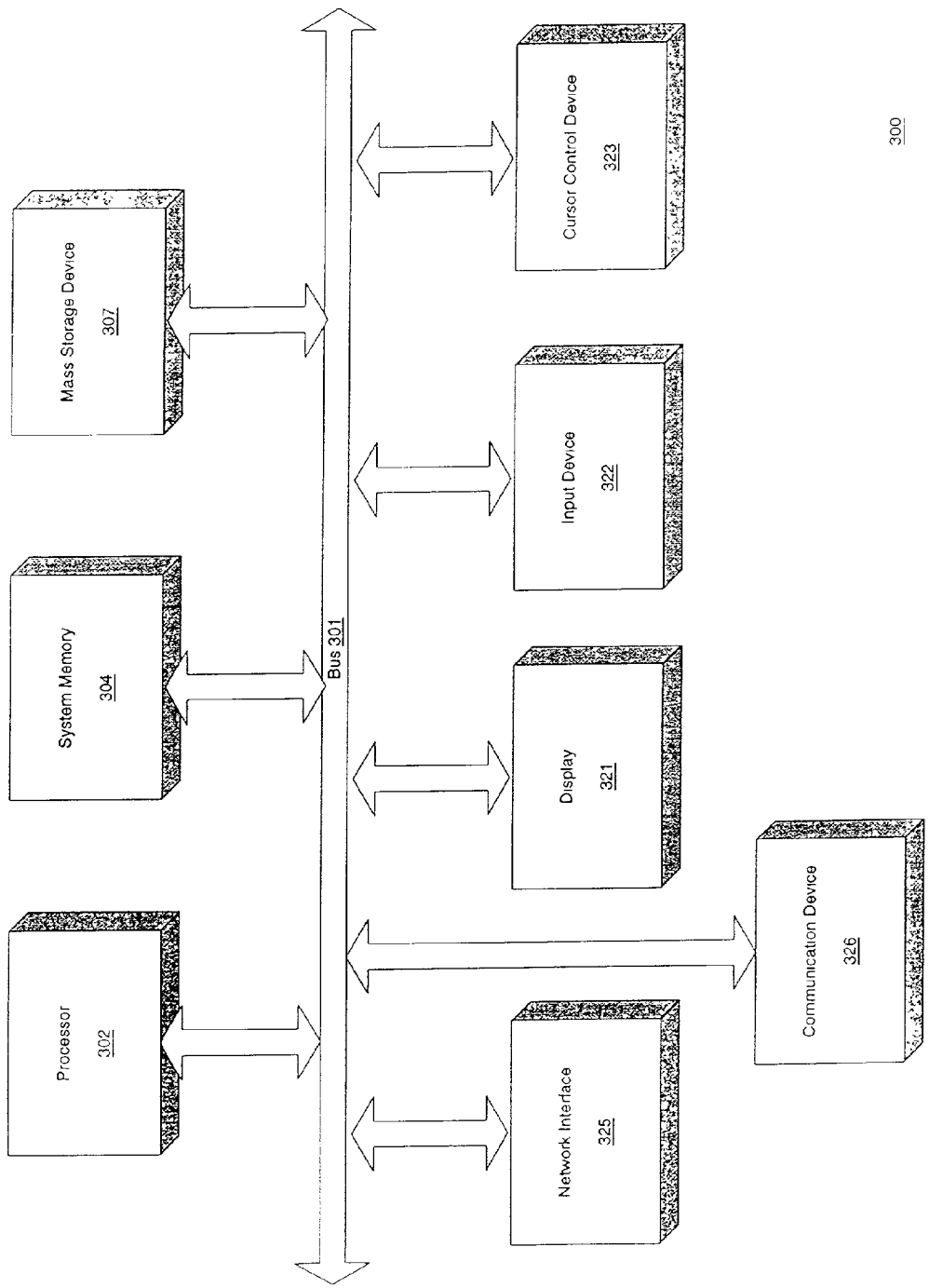
FIG. 3 illustrates one embodiment of a host satellite system in the form of digital processing system.

FIG. 3 illustrates one embodiment of a host satellite system in the form of digital processing system 300 representing an exemplary workstation, personal computer, server, etc., in which features of the present invention may be implemented.

Digital processing system 300 includes a bus or other communication means 301 for communicating information, and a processing means such as processor 302 coupled with bus 301 for processing information. Digital processing system 300 further includes system memory 304 that may include a random access memory (RAM), or other dynamic storage device, coupled to bus 301 for storing information and instructions to be executed by processor 302. System memory 304 also may be used for storing temporary variables or other intermediate information during execution of instructions by processor 302. System memory 304 may also include a read only memory (ROM) and/or other static storage device coupled to bus 301 for storing static information and instructions for processor 302.

A mass storage device 307 such as a magnetic disk or optical disc and its corresponding drive may also be coupled to digital processing system 300 for storing information and instructions. The data storage device 307 may be used to store instructions for performing the steps discussed herein. Processor 302 may be configured to execute the instructions for performing the steps discussed herein. In one embodiment, digital processing system 300 is configured to operate with a LINUX operating system stored on data storage device 307. In alternative embodiments, another operating system may be used, for examples, UNIX, Windows NT, and Solaris.

In one embodiment, digital processing system 300 may also be coupled via bus 301 to a display device 321, such as a cathode ray tube (CRT) or Liquid Crystal Display (LCD), for displaying information to system administrator. For example, graphical and/or textual depictions/indications of system performance characteristics, and other data types and information may be presented to the system administrator on the display device 321. Typically, an alphanumeric input device 322, including alphanumeric and other keys, may be coupled to bus 301 for communicating information and/or command selections to processor 302. Another type of user input device is cursor control 323, such as a mouse, a trackball, or cursor direction keys for communicating direction information and command selections to processor 302 and for controlling cursor movement on display 321.

A network interface device 325 is also coupled to bus 301. Depending upon the particular design environment implementation, the network interface device 325 may be an Ethernet card, token ring card, or other types of physical attachment for purposes of providing a communication link to support a local area network, for example, for which digital processing system 300 is monitoring. In any event, in this manner, digital processing system 300 may be coupled to a number of clients and/or servers via a conventional network infrastructure, such as a company's Intranet and/or the Internet, for example.

It will be appreciated that the digital processing system 300 represents only one example of a system, which may have many different configurations and architectures, and which may be employed with the present invention. For example, some systems often have multiple buses, such as a peripheral bus, a dedicated cache bus, etc.

In one embodiment, a communication device 326 may also be coupled to bus 301. The communication device 326 may be a modem, or other well-known interface device, for providing a communication link to a MOC independent of the communication link to which network interface 325 is connected. In this manner, communication device 326 provides a backup link to a MOC if the primary link fails as illustrated by FIG. 4.

Figure 4:
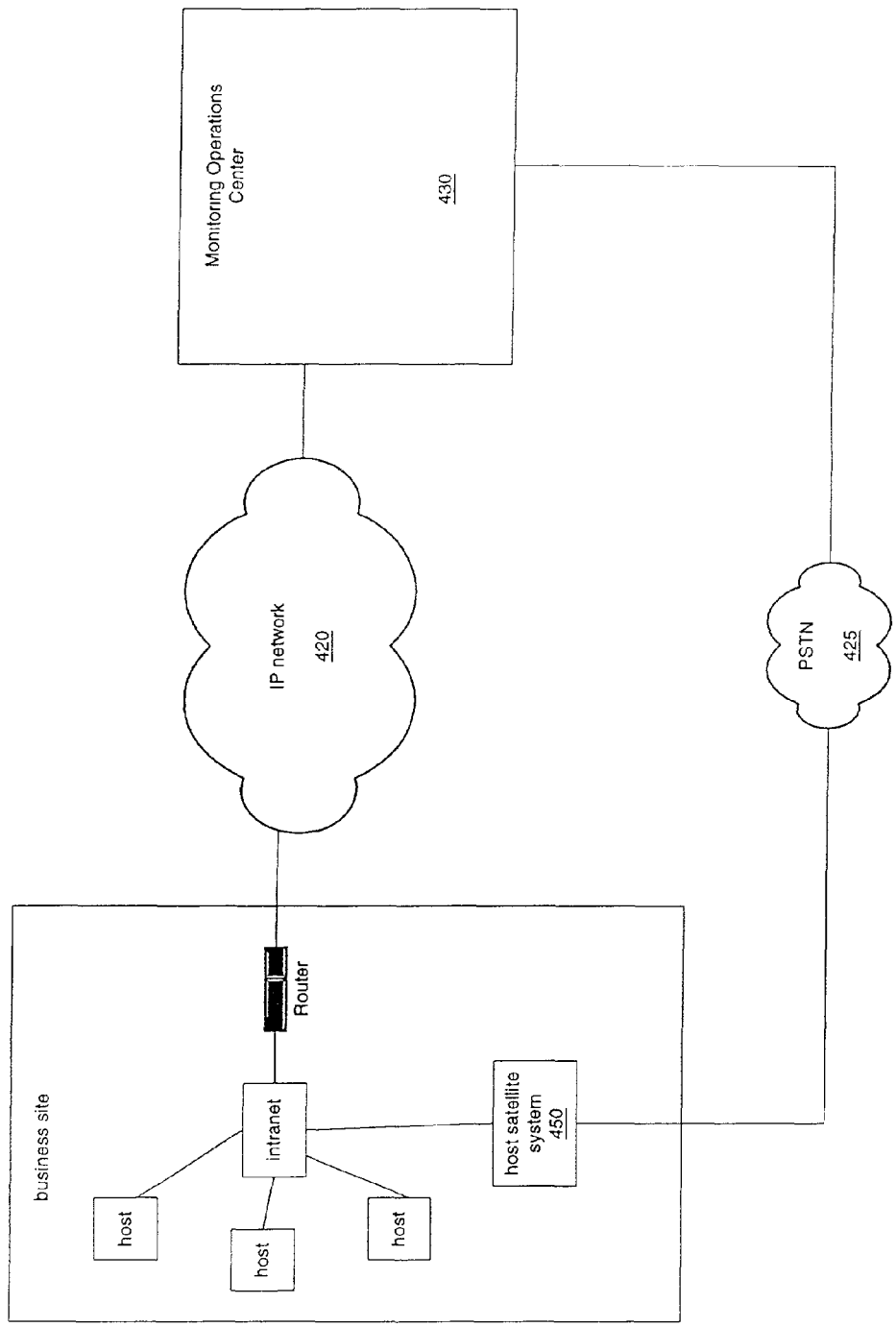
FIG. 4 illustrates an alternative embodiment of a network site monitoring system.

For example, referring to FIG. 4, host satellite system 450 may include a modem to enable communication via the Public Switched Telephone Network (PSTN) 425 with MOC 430 independent of the communication link through IP network 420. In an alternative embodiment, other communication means (e.g., wireless network and private voice and/or data network) may be used to enable host satellite system 450 communication with MOC 430 independent of IP network 420.

Referring again to FIG. 2A, the monitoring software residing on host satellite system 250 performs both external and internal monitoring of hosts 211-213. For external monitoring, host satellite system 250 monitors network services of a host by accessing the host's ports that are connected to intranetwork 215. As previously discussed, types of network services may include, for examples, SMTP, web page display using HTTP, news article distribution using NNTP, fetching email from a remote mailbox using POP3, and determining whether a particular IP address is accessible using a PING utility. Each service may be configured on an industry standard port or on a custom port. If a service operates with a custom port, then host satellite system 250 may either be preprogrammed with the port information or make perform searches to determine a port's configuration.

FIG. 2B illustrates an exemplary table of monitored services and states. For example, if a host is configured to operate as an HTTP server, the host satellite system may attempt to establish a connection to industry standard TCP port 80 (or port 443 if HTTPS is used) to check 291 the port/service. The host satellite system checks the HTTP service on that port and generates one or more state changes if the service is not operating according to predetermined states, for example, if the answer time is above a threshold value. The test may follow redirects, search for strings and regular expressions, check connection times, and report on certificate expiration times.

If no reply is received, then the host satellite system may determine that the port 80 for that particular host is either down or that a different port is being used for the service. As previously mentioned, a host may support the services listed in FIG. 2B and/or custom services assigned to different ports.

FIG. 2C is an exemplary table illustrating threshold levels and corresponding values that may be set for embodiments of host parameters. For internal monitoring, the host satellite system logs into a host to monitor the host's resources and evaluate internal states of the host system. In one embodiment, a host's resources may include, for examples, processor, load, disk storage, main memory storage, log files, etc. The internal states of a host may include, for examples, load on the host 243, processor utilization 242, disk utilization 241, memory utilization 244, number of users connected to the host 245, and number of process running on the host 246. One or more notifications may be generated when an internal state exceeds a corresponding predetermined threshold value as illustrated in FIG. 2C. The internal monitoring may include recording of states over time (e.g., the amount of available memory at given time intervals); identification of state changes; and notification of state changes.

In one embodiment, the available disk space 241 of a host system may be monitored and a notification generated if the percentage of available space exceeds one of the threshold values. If a host is considered to have more than 25% of its disk space free during its normal operations, for example, then the host satellite system may be configured to record the amount of available disk space in predetermined time increments (e.g., every 10 minutes); identify a state change when the amount of disk space being used reaches 75%; and generate a warning notification of the state change. In another embodiment, a critical notification may be generated when the amount of disk space being used reaches 90%. The host satellite system stores this information for later collection by the MOC. In one embodiment, the monitoring software may be NetSaint available from Ethan Galstad at http://www.netsaint.org. Alternatively, other monitoring software may be used, for examples, HP Openview and Sitescope. In another embodiment, a custom monitoring software may be created.

Referring again to FIG. 2A, the data stored on host satellite system 250 may either be pushed or pulled across extranetwork 220 to MOC 230 for processing such as evaluation, notification, and reporting. In one embodiment, for example, host satellite system 250 pushes the stored data across extranetwork 220 to servers at MOC 230. The data may be pushed to different servers, and stored in corresponding databases, depending on the type of data, as discussed below in relation to FIG. 5. With either a push or pull methodology, the data may be periodically transferred between host satellite system 250 and NOC 230.

In one embodiment, host satellite system 250 includes a queuing client to store and queue collected data and periodically transmit the data to MOC 230. In an alternative embodiment, host satellite system 250 includes multiple queues with each one configured to store and queue different types of data. For example, one queue may be used for state change data and another queue may be used for time series data. The transmission of data from the multiple queues may be prioritized, for example, all notifications may be set to go to MOC 230 before state change or time series data.

Figure 5:
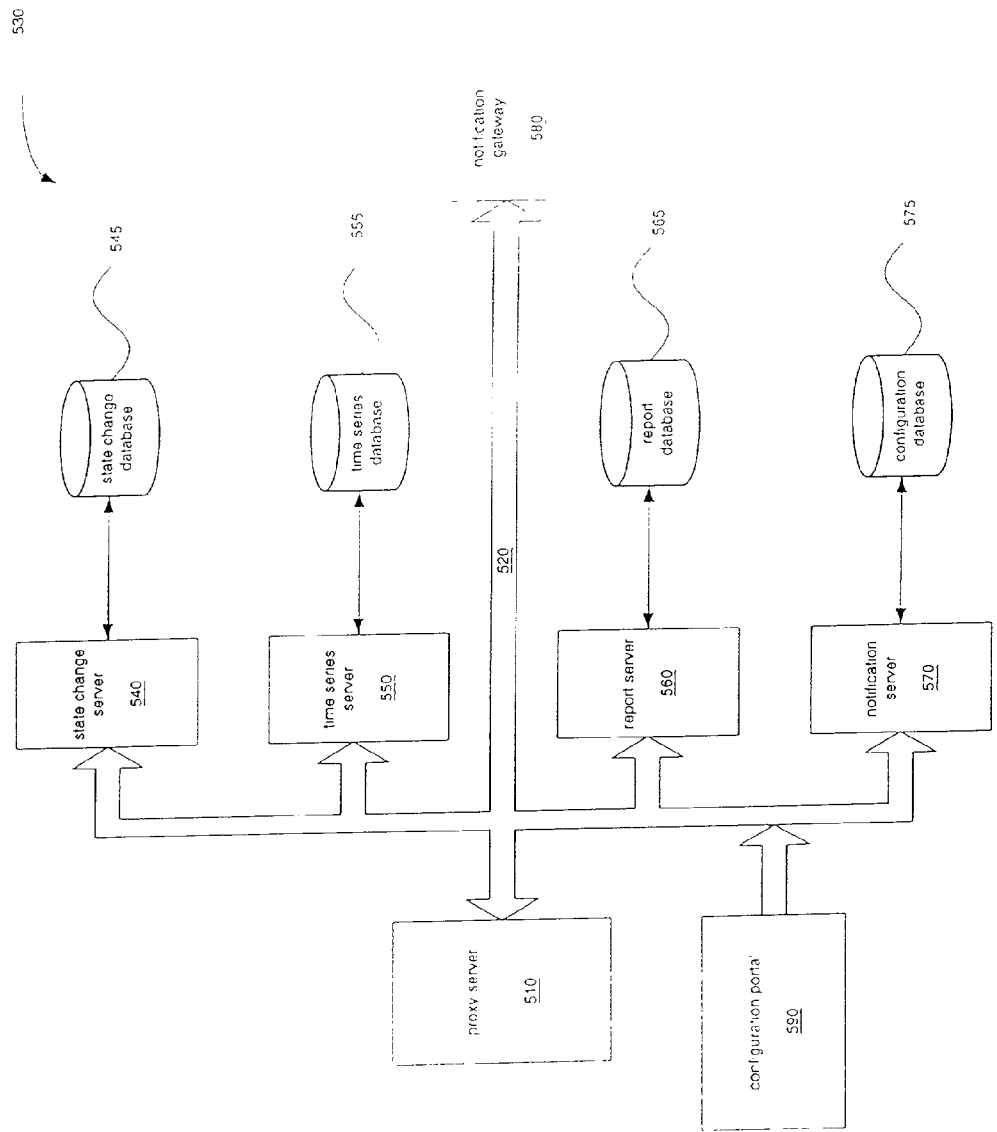
FIG. 5 is a block diagram illustrating an exemplary architecture of a monitoring operations center.

FIG. 5 is a block diagram illustrating an exemplary architecture of a monitoring operations center. The architecture may be implemented on one or more servers and corresponding databases. In one embodiment, MOC 530 may include a proxy server 510, a notification gateway 580, a state change server 540, a time series server 550, a reports server 560, a configuration server 570, and a bus or other communication means 520 for communicating information among them. The servers 540, 550, 560, and 570 may include corresponding databases, for examples: a state change database 545 for storing state change data; a time series database 555 for storing information (e.g., load) over time; a reports database 565 for storing report data; and a configuration database 565 for storing notifications, event handling, trouble tickets, and backup storage, as discussed in detail below. The hardware configuration of the servers may be similar to the digital processing systems discussed above in relation to FIG. 3.

MOC 530 may include proxy server 510 to operate as an intermediary between a servers 540-570 and an extranetwork (e.g., extranetwork 220 of FIG. 2) to enable security, administrative control, and caching service. Proxy server 510 may be associated with or be part of a gateway server (e.g., gateway server 580) that separates MOC 530 from the extranetwork and a firewall server that protects MOC 530 from outside intrusion. Proxy server 510 may also operate as a cache server. The functions of proxy, firewall, and caching can be in separate server programs or combined in a single program. Different server programs can be in different servers. For example, a proxy server may be in the same machine with a firewall server or it may be on a separate server and forward requests through the firewall. Proxy, firewalls, and caching are well known in the art; accordingly, a detailed discussion is not provided herein.

The configuration portal 590 is an interface that may be used by a business site to configure host parameter monitoring, notification, escalation rules, and provide reporting and organization of the data collected about the business site infrastructure. In one embodiment, portal 590 may be in the form of a web-based interface having inputs (e.g., in the form of screens with CGI scripts) to populate portal 590. The configured information may include what a business site desires to be monitored (e.g., host IDs/addresses, host parameters, services, expected parameter values, frequency of monitoring, etc.). For example, a business site may configure the parameters illustrated in FIG. 2B, for one or more hosts, on one or more host satellite systems residing at their site. As previously discussed, monitoring parameters for other host services and resources may be also be configured.

Additional service parameters may include, for examples, service interleave factor, maximum concurrent service checks, host check, and inter-check delay. Service interleave factor determines how service checks are interleaved. Interleaving allows for a more even distribution of service checks, reduced load on hosts, and faster overall detection of host problems. With the introduction of service check parallelization, a host may get bombarded with checks if interleaving is not permitted. This may cause the service check to fail or return incorrect results if the host is overloaded with processing other service check requests. Host check is used to determine if a host is up or down. Inter-check delay determines how service checks are initially distributed in an event queue. The use of delays between service checks may help to reduce, or even eliminate, CPU load spikes on a host.

In one embodiment, other types of parameters may be configured, for example, timing parameters. The timing parameters may include, for examples, time between failed checks, check period, and scheduling passes. Check period defines the scheduled time period that a host check is performed. Time between failed checks is the amount of time between the detection of a failure and when the host, service, or satellite is checked again for the same failure. Scheduling passes is the number of seconds per "unit interval" used for timing, for example, in the scheduling queue, re-notifications, etc.

Referring still to FIG. 5, servers 540, 550, 560, 570 and their corresponding databases may be used to provide for storage of monitored parameters, notification, escalation, and reporting. Notification server 570 may include a common gateway interface (CGI) that defines the protocol by which notification server 570 interacts with the program that processes the data sent from a host satellite system. Notification gateway 580 is used to generate alerts through various communication means as discussed below in relation to FIG. 6.

Figure 6:
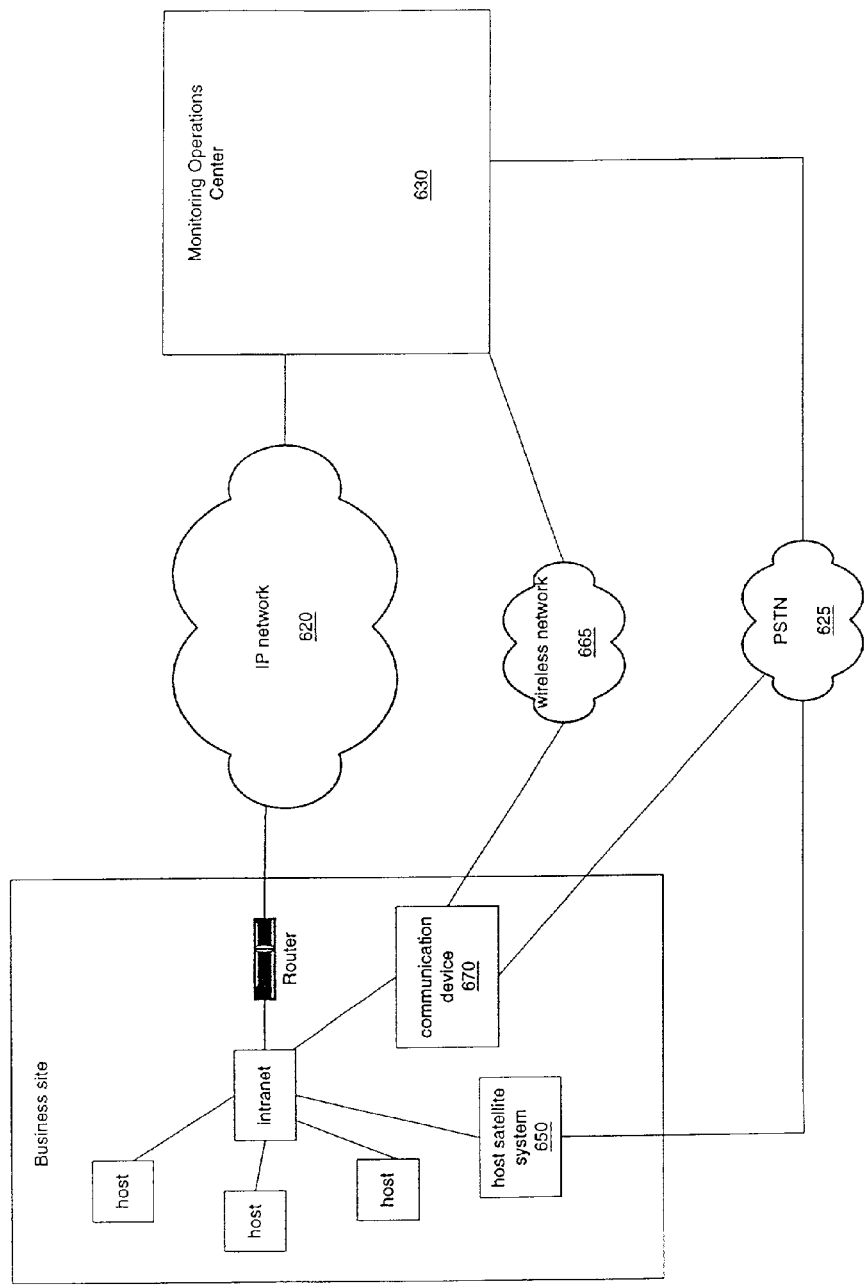
FIG. 6 illustrates one embodiment of a network site notification system.

When a predetermined event occurs, a person designated to receive a notification may receive such notification by the sending of an alert through a communication channel to a communication device 670, as illustrated in FIG. 6. The communication device may be, for examples, a pager, a telephone, voicemail system, email system with the appropriate transmission protocols used. In one embodiment, for example, communication device 670 may be land-line phone coupled to PSTN 625 and the alert may be transmitted through PSTN 625. In an alternative embodiment, communication device 670 may be a client system capable of receiving emails that is coupled to IP network 620 and the alert may be transmitted through IP network 620. In yet another embodiment, for example, communication device 670 may be a wireless phone coupled to wireless network 665 and the alert may be transmitted through wireless network 665. In an alternative embodiment, other communication devices, and corresponding channels, may be used, for examples, electronic sign boards. Notifications are not limited to only a single communication device or channel. An alert may be transmitted to multiple communications devices in parallel or in series.

With the CGI, a notification server of MOC 630 may serve information that is stored in a format that is not readable by the communication device by presenting such information in a form that is readable communication device 670. The CGI receives the data (e.g., which host had a state change and the particular state that changed) sent from host satellite system 650 to MOC 630 and constructs a message, referred to as an alert, for transmission to communication device 670. Alert programs are known in the art; accordingly a detailed discussion is not provided. In one embodiment, for example, the TelAlert program available from Telamon of Oakland, Calif. may be used.

Referring again to FIG. 5, notifications may be set up with various notification and escalation parameters that determine hierarchies and priorities. For example, a notification may be configured for transmission to one or more communications devices of a particular person. If that person does not acknowledge the notification in a predetermined period of time, a set of escalation parameters may be established to send the notification to the communication device(s) of another person or persons. Furthermore, the escalation of the notification may be prioritized based on a particular type of notification.

In one embodiment, notification parameters may include, for examples, notify on critical, notify on host down, notify on recovery, notify on warning, and time between notifications. The notify on critical parameter determines whether a contact is notified if a service is in a critical state. The notify on host down parameter determines whether notifications are sent to any contacts if the host is in a down state. The notify on recovery parameter determines whether notifications are sent to any contacts if the host is in a recovery state. The notify on warning parameter determines whether a contact will be notified if a service is in either a warning or an unknown state. Time between notifications is the number of time units to wait before re-notifying a contact that a server is still down.

In one embodiment, the system may be configured to prevent the generation of multiple notifications for host state changes that are dependent upon one another. For example, a service probe is dependent on a host probe. If a host is down then service probes of that host would generate multiple state changes due to the non-operation of all the services of that host. In order to avoid redundant dependency notifications, those services probes that are already known to be dependent upon the same host probe may be disabled. Alternatively, state changes may be analyzed at the MOC to avoid transmission of dependent notifications.

In one embodiment, an analysis engine may be used to provide suggestions of probable causes of and solutions to problems evidenced by state changes. The expertise of individuals that have diagnosed and solved problems is used to build a database relating problems with causes and solutions. The analysis engine evaluates the state change that occurs based on the stored database of knowledge and provides a list of possible causes that may be attributable to the state change along with a possible solution.

As previously discussed, if a notification is not acknowledged, it may be escalated based a set of escalation rules. The escalation rules may be based on configurable parameters such acknowledgment wait (i.e., the time delay between sending of the notification and receipt of acknowledgment before escalating the notification to the next level in the hierarchy), severity of the problem for which notification is being sent, and notification schedules for on-staff persons of the business site. Escalation parameters may also include, for examples: contact members, contact groups, contact schedule, contact means. The contact members parameter is used to establish the persons for the sending of a notification. Contact group is used to group one or more contact members together for the purpose of sending out notifications and recovery notifications. Contact schedule specifies the days and times for contact notification. Contact means determines which communications means (e.g., pager, email, phone, etc.) is used for notification.

In one embodiment, an advanced notification rule may be generated that suspend, redirect, or automatically acknowledge a standard notification, or transmit a supplemental notification. Here, configurable advanced notification parameters for an advanced notification rule may include a rule type, a redirection location, a rule scope, and a rule duration, as will be further described below.

As will be appreciated, an advanced notification rule is meant to preempt a standard notification rule for a temporary amount of time. Examples of a standard notification rule may include the generated notification on critical, on host down, on recovery, and on warning as described above. However, here, when the criteria for a standard notification rule is satisfied, an advanced notification rule will temporary determine the notification hierarchies and priorities.

Figure 8:
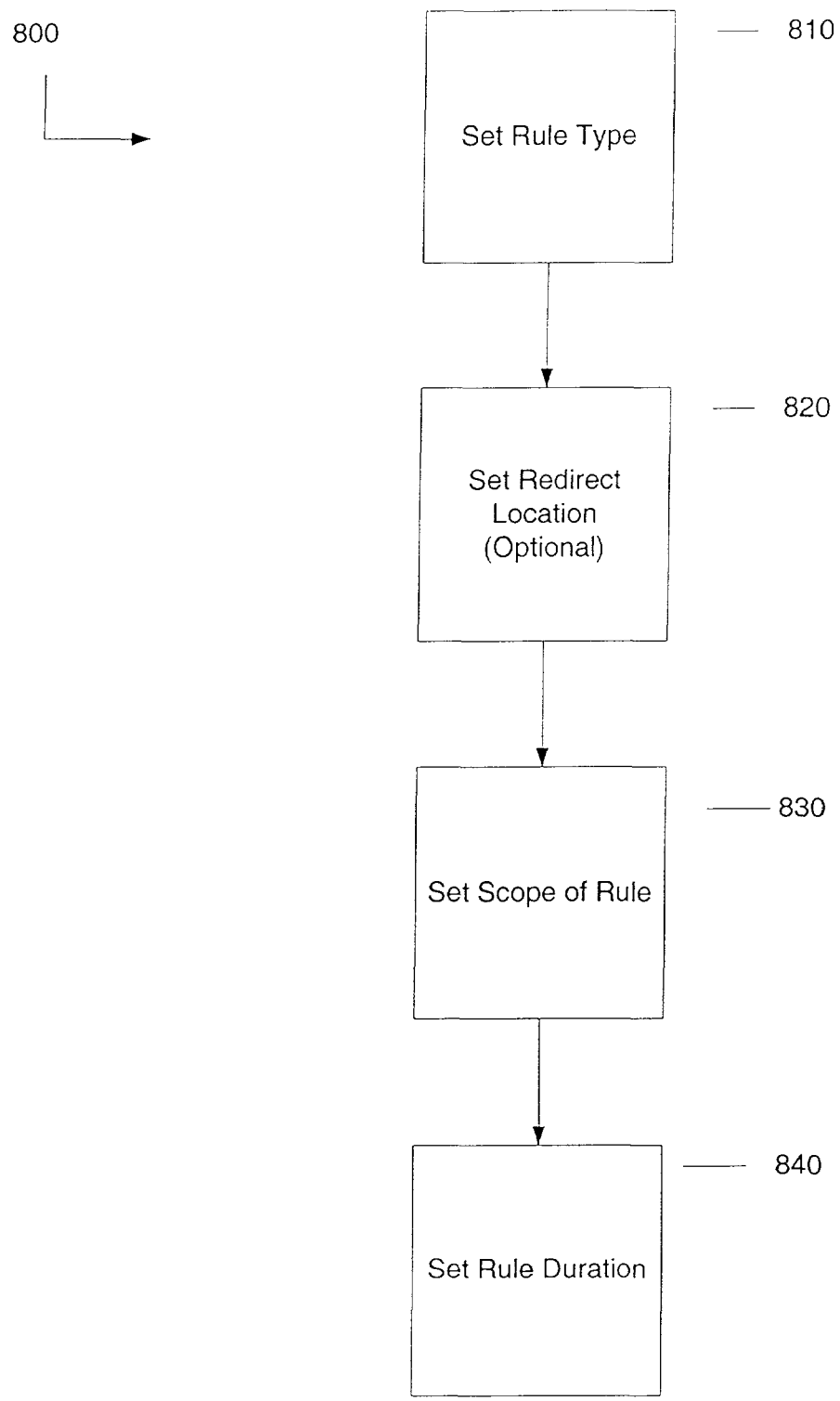
FIG. 8 illustrates a flow diagram for creating an advanced notification rule according to one embodiment.

FIG. 8 illustrates a flow diagram for creating an advanced notification rule according to one embodiment. At block 810, the rule type parameter of the advanced notification rule is configured. The rule type parameter determines the manner in which the advanced notification rule is to behave. In one embodiment, there are four rule types defined for an advanced notification rule: (1) Redirect Standard Notification; (2) Supplemental Notification; (3) Suspend Standard Notification; and (4) Automatic Acknowledgement.

If the redirect standard notification type parameter is set, then upon satisfying a standard notification rule criteria, a notification is transmitted to a redirect destination, instead of the previously configured destination in the standard notification rule. For example, a standard notification rule may have originally been configured to notify a Manager A when a node reaches a critical state. However, when Manager A is temporarily unavailable (e.g., on vacation), a redirect standard notification type of advanced notification rule may be enabled to redirect the notification to a Manager B for a temporary amount of time (e.g., until Manager A returns from vacation).

If the supplemental notification type of parameter is set, then upon satisfying a standard notification rule criteria, a notification is transmitted to a redirect destination in addition to the previously configured destination in the standard notification rule. For example, a standard notification may have been configured to notify a Manager A when a node reaches a critical state. However, when Manager A is temporary unavailable (e.g., out of the office for the day), a supplemental notification type of advanced notification may be enabled to transmit a supplemental notification to a Manager B, in addition to transmitting the standard notification to Manager A, for a temporary amount of time (e.g., until Manager A returns to the office).

If the suspend standard notification type parameter is set, then upon satisfying a standard notification rule criteria, the standard notification rule is temporary suspended and a notification will not be transmitted. For example, a suspend notification type of advanced notification rule may be enabled when a node is undergoing maintenance. In this way, no notifications will be transmitted during the maintenance time, though monitoring and data collection will continue uninterrupted.

If the automatic acknowledgement notification type parameter is set, then upon satisfying a standard notification rule criteria and generating the standard notification to the previously configured destination, this notification is automatic acknowledged. As described above, acknowledgements are used to determine when to escalate and send a notification to the communication device(s) of another person or persons. For example, a standard notification may originally have been configured to notify an operator when a node reaches a critical state, and to re-notify every five minutes until the node returns to an OK state. The standard notification may have been set up to notify Operator A, then to escalate to Operator B if Operator A fails to respond. When the node fails and Operator A is notified, he/she may need to work on the problem for 30 minutes. By setting up an automatic acknowledgement type of advanced notification rule with a 30-minute lifespan, Operator A can continue to get alerts (to know that the problem still exists) without having to create acknowledgements every 5 minutes to prevent escalation.

At block 820, if necessary, the redirect destination parameter is configured in the advanced notification rule. The redirect destination is the destination where the advanced notification rule will transmit a notification, if necessary. As described above, the redirect destination is necessary if the rule type parameter is set to redirect standard notification or supplemental notification.

At block 830, the scope parameter of the advanced notification rule is configured. Here, the scope determines which standard notification rule(s) that the advanced notification rule will apply to. In one embodiment, the advanced notification rule may be applied to a specific company as a whole, a satellite belonging to a specific company, a specific host assigned to a specific company, a specific service that is configured on a specific host for a specific company, a check type (e.g., notifications from specific a HTTP check, a host availability check, and/or a service check), a host state, a service state (e.g., any state a service probe may be in, such as OK, warning, critical, unknown), a specific contact group, or a specific message pattern.

For example, if a standard rule generates notifications to Group A, and an advanced notification rule is enabled having the rule type of suspend standard notification and the scope configured for Group A, then all standard notifications to Group A will be suspended when this standard notification rule is satisfied, accordingly.

In one embodiment, the scope of an advanced notification rule may be explicitly expressed in a message pattern. A message pattern is a regular expression that is well known in the art and here operates on the content of the alert message rather than the source of the alert (e.g., host probe, service probe, satellite, etc). For example, to redirect all messages pertaining to broken HTTP links, one could create a redirect standard notification type of advanced notification rule with the message pattern:

"http://.*: Not Found".

This pattern would match any alert that contained "http://" followed by ": Not Found" with any number of intervening characters, regardless of the source of the alert.

At block 840, the duration parameter of the advanced notification rule is configured. As stated above, an advanced notification rule is active for a temporary amount of time. Therefore, when an advanced notification rule is generated it is given a specific time frame to be active, such as, for a number of hours, weeks, days, or years. In one embodiment, upon expiration of this configured time frame, the advanced notification rule will be automatically deactivated. For example, if an advanced notification rule has the duration parameter configured for two weeks (e.g., the duration of Manager A's vacation), then this advanced notification rule will automatically expire after the end of the two week duration.

Referring again to FIG. 5, in one embodiment, notifications may be stored in configuration database 575. Based on a notification hierarchy and escalation parameters, a notification may take some time to process. The state of notification information may need to be maintained during that time period in case of server failure. As such, the notification and the alerts already generated may be saved in the configuration database 575 and the notification process restarted on another operational server so that the notification process may be resumed. For example, a notification may be configured to first notify person A's email, and then person B's email if person A does not acknowledge the notification in a predetermined time period (e.g., 60 minutes) and then person C's phone if neither person A nor B acknowledge the notification within a similar or different predetermined time period (e.g., 30 minutes). During those time periods (e.g., 90 minutes), the configuration database may operate as a backup database in case of failure of a notification server. As such, if a notification server 570 fails after person B is notified, a redundant notification server (not shown) may use the data stored in configuration database 575 to notify person C if person B has not acknowledged within the allotted time.

In one embodiment, notification server 570 includes an event handler script that recognizes when a notification is complete, determines whether the notification is completed successful, and analyzes whether the escalation rules were followed. A notification may be deemed to be successful based on a predetermined standard, for example, a person in the notification hierarchy acknowledged a notification. In one embodiment, the predetermined standard for a successful notification may be configured by the business site. If the notification is deemed not to be successfully completed, then an alert may be sent to notifies a person associated with MOC 530 of the notification failure. In this manner, that person may decide what, if any, additional actions may be taken including attempting to correct the problem (that caused the state change) for the customer.

In one embodiment, report server 560 may generate real-time and historical reports of the data received from the host satellite system about the business site' infrastructure. In one embodiment, the reports may be stored in report database 565 as a result of a predetermined query (e.g., daily, weekly, monthly, etc.). The report database 565 may be accessed through configuration portal 590. Configuration interface 590 may generate reports based on pre-stored or configurable queries. Alternatively, a user can specify a query based on a specific infrastructure view (e.g., monitor, host, port, etc.). In addition, the reporting format of collected data may also be configured, for examples, graphics of state change, graphs over time, number of notifications in progress, how many probes into the business site are reporting a bad status, etc. It should be noted that all of the parameters discussed herein in relation to FIGS. 2-7 may either be configured by a business site or by a MOC.

Figure 7:
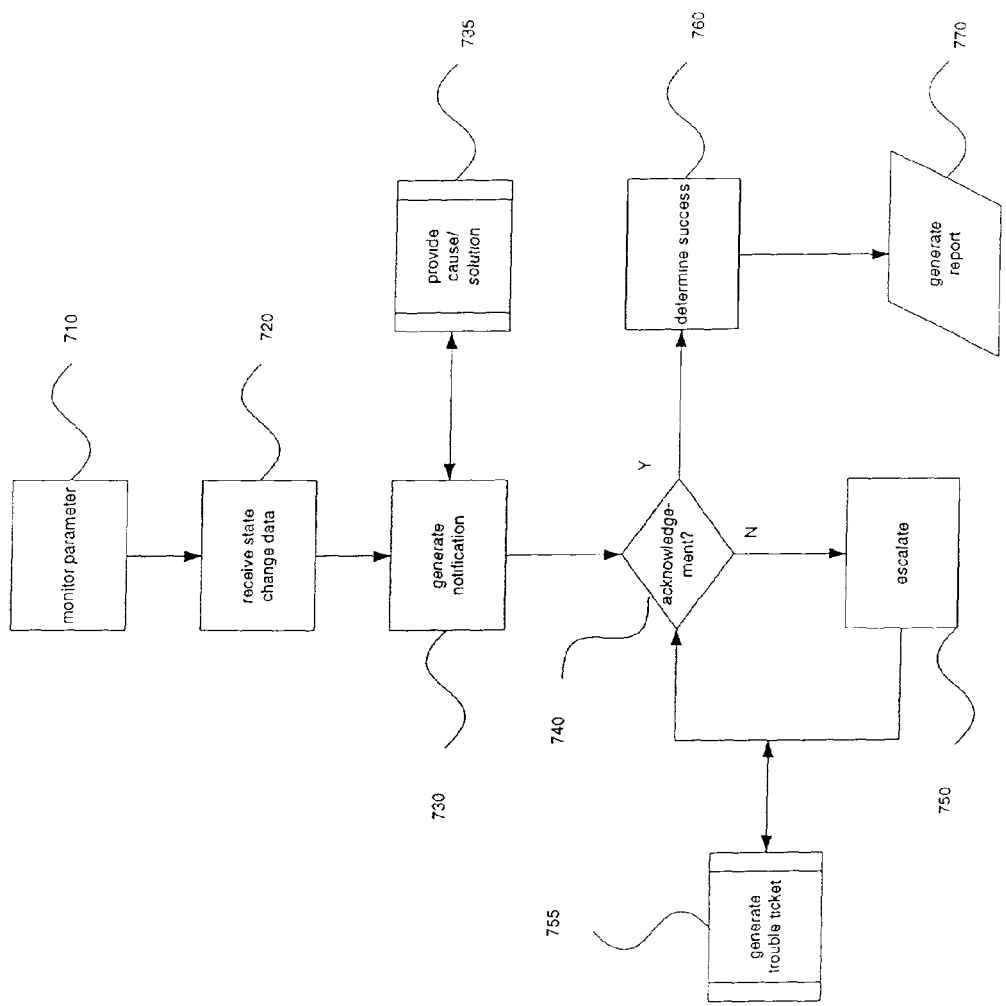
FIG. 7 illustrates one embodiment of an administration method.

FIG. 7 illustrates one embodiment of an administration method. In one embodiment, a parameter of a host system is monitored for a predetermined event, step 710. The predetermined event may be a state change of the monitored parameter. Data that includes the state change data may be received by a monitoring operations center, step 720. The monitoring operations center may generate a notification of the state change upon the occurrence of the predetermined event with the notification sent to a first person in a hierarchy, step 730. In one embodiment, a possible cause of the occurrence and a possible corrective action may be provided, step 735.

If an acknowledgement is not received with a certain configurable time period, step 740, then the notification may be escalated to another person in the hierarchy, step 750. The escalation may be repeated if an acknowledgment is not received within a configurable time period. In one embodiment, a trouble ticket may be generated at a predetermined point in the hierarchy to track the escalation, step 755.

In one embodiment, a determination may be made as to whether the notification is completed successful, step 760. A report may be generated based on the data received by the monitoring operations center, step 770.

Referring again to FIG. 2, host satellite system 250 may also be used to monitor asset parameters of a business site's infrastructure 210. The asset parameters are those that may be used to track and identify the assets of business site 210 that may be used by, for example, an accounting department. The asset parameters may include, for examples: serial number of a host; model number of a host; rack location; asset ID; lease ID; operating system type; the number of processors the host has installed; processor type.

In one embodiment, the steps discussed above may be implemented with an interpreter program. An interpreter is a language processor that analyzes a program (i.e., lines of code) and then carries out the specified actions (processes instructions) at the time of execution, rather than producing a machine-code translation to be executed later (as with a compiler). In one embodiment, the steps discussed above are coded using Perl. In an alternative embodiment, other programming languages may be used.

The methods and apparatuses described herein may provide businesses a means to proactively monitor their site's resources from a remote location. The result of this may be the prevention of problems before they happen and the reduction in the need for reactive problem solving. In addition, with no agents to install on client host machines, there may be no maintenance issues with version progressions for a business. Additionally, such a solution may eliminate large footprints that consume the valuable system resources of a business.

In addition, statistical reports, historical trend information, and asset management may also be provided to the business site. Such data may allow for more informed business decisions and drive down costs of unnecessary hardware purchases and the number of required support professionals.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   receiving, by a server computing system outside a firewall of a private network, monitoring data on performance characteristics of a plurality of hosts on the private network and inside the firewall from a network monitoring system of the private network, the monitoring data comprising one or more external parameters of the plurality of hosts available by accessing one or more ports of the plurality of hosts and one or more internal parameters of the plurality of hosts available by logging into the plurality of hosts;
   detecting, by the server computing system, an occurrence of a predetermined event on a host of the plurality of hosts based on the monitoring data, the predetermined event including at least one of an internal event associated with the one or more internal parameters or an external event associated with the one or more external parameters, wherein the predetermined event is associated with a standard notification rule;
   when an advanced notification rule associated with the standard notification rule is enabled, and upon occurrence of the predetermined event, performing the following:
   preventing the generation of a first notification associated with the standard notification rule;
   generating a second notification based on the advanced notification rule; and
   sending the second notification.

2. The method of claim 1, wherein the advanced notification rule includes a scope and wherein the scope of the advanced notification rule is configured by at least one of the group consisting of a company, a satellite, a host assigned to a company, a service configured on a host for a company, a check type, a host state, a service state, a contact group, and a message pattern.

3. The method of claim 1 where the advanced notification rule is configured to disable the standard notification rule for a temporary amount of time.

4. A non-transitory machine readable medium having stored thereon instructions, which when executed by a processor of a server computing system outside a firewall of a private network, cause the processor to perform the following:
   receiving, by the processor, monitoring data on performance characteristics of a plurality of hosts on the private network and inside the firewall from a network monitoring system of the private network, the monitoring data comprising one or more external parameters of the plurality of hosts available by accessing one or more ports of the plurality of hosts and one or more internal parameters of the plurality of hosts available by logging into the plurality of hosts;
   detecting, by the processor, an occurrence of a predetermined event on a host of the plurality of hosts based on the monitoring data, the predetermined event including at least one of an internal event associated with the one or more internal parameters or an external event associated with the one or more external parameters, wherein the predetermined event is associated with a standard notification rule;
   when an advanced notification rule associated with the standard notification rule is enabled and upon occurrence of the predetermined event, performing the following:
   preventing the generation of a first notification associated with the standard notification rule;
   generating a second notification based on the advanced notification rule; and
   sending the second notification.

5. The non-transitory machine readable medium of claim 4, wherein the advanced notification rule includes a scope where the scope of the advanced notification rule configured by at least one of the group consisting of a company, a satellite, a host assigned to a company, a service configured on a host for a company, a check type, a host state, a service state, a contact group, and a message pattern.

6. The non-transitory machine readable medium of claim 4, wherein the advanced notification rule is configured to disable the standard notification rule for a temporary amount of time.

7. A server computing system, comprising:
   means for receiving, by the server computing system, while outside a firewall of a private network, monitoring data on performance characteristics of a plurality of hosts on the private network and inside the firewall from a network monitoring system of the private network, the monitoring data comprising one or more external parameters available by accessing one or more ports of the plurality of hosts and one or more internal parameters of the plurality of hosts available by logging into the plurality of hosts;
   means for detecting an occurrence of a predetermined event on a host of the plurality of hosts based on the monitoring data, the predetermined event including at least one of an internal event associated with the one or more internal parameters or an external event associated with the one or more external parameters, wherein the predetermined event is associated with a standard notification rule;

means for performing the following when an advanced notification rule associated with the standard notification rule is enabled, and upon occurrence of the predetermined event:
preventing the generation of a first notification associated with the standard notification rule;
generating a second notification based on the advanced notification rule; and sending the second notification.

8. The server computing device of claim 7, wherein the advanced notification rule includes a scope and wherein the scope of the advanced notification rule is configured by at least one of the group consisting of a company, a satellite, a host assigned to a company, a service configured on a host for a company, a check type, a host state, a service state, a contact group, and a message pattern.

9. The server computing device of claim 7 where the advanced notification rule is configured to disable the standard notification rule for a temporary amount of time.

10. A server computing device, comprising:
a processor configured to:
receive monitoring data on performance characteristics of a plurality of hosts on a private network and inside a firewall of the private network from a network monitoring system of the private network, wherein the server computing device is outside the firewall of the private network, the monitoring data comprising one or more external parameters available accessing one or more ports of the plurality of hosts and one or more internal parameters of the plurality of hosts available by logging into the plurality of hosts;
detect an occurrence of a predetermined event on a host of the plurality of hosts based on the monitoring data, the predetermined event including at least one of an internal event associated with the one or more internal parameters or an external event associated with the one or more external parameters, wherein the predetermined event is associated with a standard notification rule;
when an advanced notification rule associated with the standard notification rule is enabled and upon occurrence of the predetermined event, perform the following:
prevent the generation of a first notification associated with the standard notification rule;
generate a second notification based on the advanced notification rule; and
send the second notification; and
a communications device coupled to the processor to transmit the second notification.

11. The server computing device of claim 10 where upon the occurrence of the predetermined event and if the advanced notification rule is not enabled, the processor acknowledges the first notification sent to the first communication device of the first person.

12. The method of claim 1, wherein the advanced notification rule is enabled to disable the standard notification rule while continuing monitoring for the predetermined event.

13. The machine readable medium of claim 4, wherein the advanced notification rule is enabled to disable the standard notification rule while continuing monitoring for the predetermined event.

14. The apparatus of claim 7, wherein the advanced notification rule is enabled to disable the standard notification rule while continuing monitoring for the predetermined event.

15. The server computing device of claim 10, wherein the processor is configured to enable the advanced notification rule to disable the standard notification rule while continuing monitoring for the predetermined event.

16. The method of claim 1, further comprising:
sending the second notification to a plurality of communication devices of a second person in a hierarchy through a plurality of communication channels in parallel.

17. The method of claim 1, further comprising:
formatting the second notification to a format readable by a communication device, wherein the second notification is sent to the communication device.

18. The method of claim 1, wherein the notification includes suggestions of probable causes of and solutions to a detected problem that caused the occurrence of the predetermined event.

19. The method of claim 1, wherein the advanced notification rule disables a plurality of standard notification rules.

20. The method of claim 1, further comprising:
determining whether the advanced notification rule is enabled; and
in response to determining that the advanced notification rule is not enabled, performing the following:
generating the first notification based on the standard notification rule; and
sending the first notification to a first communication device of a first person in a hierarchy through a first communication channel.

* * * * *